US012734691B2

(12) United States Patent
Iskandar et al.

(10) Patent No.: US 12,734,691 B2
(45) Date of Patent: Sep. 15, 2026

(54) ROBOTIC MANIPULATOR HAVING A TASK NULL SPACE

(71) Applicant: Deutsches Zentrum für Luft- und Raumfahrt e.V., Bonn (DE)

(72) Inventors: Maged Iskandar, Wessling (DE); Jörn Vogel, Wessling (DE)

(73) Assignee: Deutsches Zentrum für Luft- und Raumfahrt e.V., Bonn (DE)

(*) Notice: Subject to any disclaimer, the term of this patent is extended or adjusted under 35 U.S.C. 154(b) by 15 days.

(21) Appl. No.: 18/836,979

(22) PCT Filed: Jun. 20, 2023

(86) PCT No.: PCT/EP2023/066528
§ 371 (c)(1),
(2) Date: Aug. 8, 2024

(87) PCT Pub. No.: WO2023/247469
PCT Pub. Date: Dec. 28, 2023

(65) Prior Publication Data

US 2025/0033209 A1 Jan. 30, 2025

(30) Foreign Application Priority Data

Jun. 21, 2022 (DE) ........................ 10 2022 115 462

(51) Int. Cl.
*B25J 9/16* (2006.01)

(52) U.S. Cl.
CPC ........... *B25J 9/1661* (2013.01); *B25J 9/1607* (2013.01); *B25J 9/1643* (2013.01); *B25J 9/1664* (2013.01);

(Continued)

(58) Field of Classification Search
CPC ...... B25J 9/1643; B25J 9/1607; B25J 9/1671; B25J 9/1605; B25J 9/1664; B25J 9/1661;

(Continued)

(56) References Cited

U.S. PATENT DOCUMENTS 11,154,985 B1 * 10/2021 Strauss ................ G05B 19/425
2008/0243307 A1 * 10/2008 Toussaint ............... B25J 9/1664 901/30

(Continued)

FOREIGN PATENT DOCUMENTS

DE 102008001664 B4 7/2015
DE 112005000166 B4 9/2015

(Continued)

OTHER PUBLICATIONS

Chiu, Stephen L., "Task Compatability of Manipulator Postures", The International Journal of Robotics Research, vol. 7, Oct. 1988, No. 5, pp. 13-21.

(Continued)

*Primary Examiner* — Khoi H Tran
*Assistant Examiner* — Tanner L Cullen
(74) *Attorney, Agent, or Firm* — Hoffmann & Baron, LLP

(57) ABSTRACT

A system and method of controlling a robotic manipulator, wherein the method includes: providing information regarding a task to be executed; determining a task null space from the provided information via a computing unit, the task null space being characterized by a set of variations of a kinematic variable of the end effector, with all of which variations the task is capable of being executed; establishing observation points by discretizing the task null space into a finite number of the variations via the computing unit; executing an optimization method to optimize a predefined target function, including execution of a model of the robotic manipulator for each of the observation points; and control- (Continued)

ling the robotic manipulator to assume an optimal variation of the end effector determined according to a result of the optimization method.

17 Claims, 4 Drawing Sheets

(52) U.S. Cl.
CPC ... *B25J 9/1671* (2013.01); *G05B 2219/40367* (2013.01)

(58) Field of Classification Search
CPC ...... B25J 9/1633; B25J 9/1612; B25J 13/089; G05B 2219/40369; G05B 2219/40367; G05B 2219/40341; G05B 2219/40465; G05B 2219/40349; A61B 34/10; A61B 34/30; A61B 34/70
See application file for complete search history.

(56) References Cited

U.S. PATENT DOCUMENTS

| | | | | |
|---|---|---|---|---|
| 2011/0118872 | A1 | 5/2011 | Ortmaier et al. | |
| 2019/0001508 | A1* | 1/2019 | Li | B25J 9/1612 |
| 2019/0168383 | A1 | 6/2019 | Haddadin | |
| 2021/0298851 | A1* | 9/2021 | Huang | A61B 34/35 |
| 2021/0369373 | A1* | 12/2021 | Zhang | A61B 34/30 |
| 2022/0088780 | A1* | 3/2022 | Abdul-hadi | B25J 9/1664 |
| 2022/0097233 | A1* | 3/2022 | Wahrmann Lockhart | B25J 9/1671 |
| 2022/0250240 | A1* | 8/2022 | Gaydarov | B25J 9/0045 |
| 2022/0388161 | A1 | 12/2022 | Spenninger et al. | |
| 2024/0383144 | A1* | 11/2024 | Kamedula | B25J 9/1607 |

FOREIGN PATENT DOCUMENTS

| | | | |
|---|---|---|---|
| DE | 102016004841 | B4 | 1/2018 |
| DE | 102019101072 | B3 | 3/2020 |
| DE | 102020120116 | A1 | 4/2021 |
| DE | 102020116900 | B3 | 10/2021 |
| DE | 102019131400 | B4 | 3/2022 |
| EP | 3045272 | A1 | 7/2016 |

OTHER PUBLICATIONS

Quere, Gabriel, et al., “Shared control templates for assistive robotics”, 2020 IEEE International Conference on Robotics and Automation (ICRA), May 31-Aug. 31, 2020, Paris, France, pp. 1956-1962.

Yoshikawa, Tsuneo; “Manipulability of Robotic Mechanisms”, The International Journal of Robotics Research, vol. 4, 1985, No. 2, pp. 3-9.

English-language translation of the International Preliminary Report on Patentability issued in International Application No. PCT/EP2023/066528 on Dec. 18, 2024.

* cited by examiner

ROBOTIC MANIPULATOR HAVING A TASK NULL SPACE

CROSS REFERENCE TO RELATED APPLICATIONS

The present application is the U.S. National Phase of PCT/EP2023/066528, filed on 20 Jun. 2023, which claims priority to German Patent Application No. 10 2022 115 462.9, filed on 21 Jun. 2022, the entire contents of which are incorporated herein by reference.

BACKGROUND

Field

The invention relates to a method for controlling a robotic manipulator having an end effector, a system for controlling a robotic manipulator having an end effector, and a robotic manipulator with such a system.

Related Art

A typical robotic manipulator has a kinematic chain of mutually movable links. While linear degrees of freedom between links offer advantages for some applications, most robotic manipulators are composed of a multitude of links connected to each other by rotary joints. Regardless of the type of degrees of freedom at a connection between two links, the number of total degrees of freedom in the kinematic chain of the robotic manipulator plays a significant design role in determining the properties of the robotic manipulator. While a higher number of degrees of freedom leads to a more complex product with a much more complex control system, it also opens up more possibilities for carrying out a task. If more degrees of freedom are provided than necessary, this is called a redundant robotic manipulator. If, for example, a robotic manipulator has a plurality of links mutually connected by joints and extending from a bearing on a base to an end effector, which links form a kinematic chain, the robotic manipulator is redundant in particular if the pose, namely the position and orientation of the links between the base and the end effector, can be changed without changing the pose of the end effector.

Such a movement of the links in the so-called null space does not fundamentally change the execution of the task due to the constant position of a reference point of the end effector (in some systems also the complete pose of the end effector), but the force transmission can be changed by changed joint angles in the links between the base and the end effector, for example, by avoiding singularities in the links or the approach to such singularities, so that a freely definable degree of manipulability is increased. Such a manipulability degree indicates, for example, the usable torque of motors at the joints, a remaining range of motion until a stop is reached between two links, or the remaining movement possibilities until a kinematic singularity is reached. A preferred measure of manipulability is shown in the publication "Yoshikawa, Tsuneo. 'Manipulability of robotic mechanisms'. The International Journal of Robotics Research 4, no. 2 (1985): 3-9." This results in a single scalar value that is proportional to the volume of a manipulability ellipsoid. This measure of manipulability has been further utilized in prior art to form a so called "Velocity Transmission Ratio" for specific directions, as described in publication "Chiu, Stephen L. 'Task compatibility of manipulator postures'. The International Journal of Robotics Research 7, no. 5 (1988): 13-21." An extension of these concepts, which also takes joint angle limits into account, is shown in DE 10 2020 116 900 B3.

DE 10 2020 116 900 B3 relates to a method for determining the manipulability of a handling device taking into account its joint limits; the manipulability is represented here by a manipulability ellipsoid. Among other things, this involves rotating the Jacobian matrix of the joint coordinate space to align it with the axes of the manipulability ellipsoid, as well as dividing the working space of the handling device into positive and negative Cartesian directions. Furthermore, a modified Jacobian matrix is calculated for the positive and negative Cartesian directions to take into account the joint limits of the handling device by introducing a limiting function.

Although DE 10 2020 116 900 B3 takes into account a manipulability measure together with joint angle limits, it does not explicitly take into account properties of specific tasks, in particular, physical interactions between the robotic manipulator (in particular, its end effector) and an object in the environment of the robotic manipulator. Rather, the application of DE 10 2020 116 900 B3 in reality is limited by the fact that the optimization algorithm shown there can converge to a local minimum instead of a global minimum, and by the fact that the space searched is small. Another disadvantage of this direct application of an optimization algorithm is that a loss of control occurs in applications such as those involving physical interaction; for example, when using impedance control to generate an artificial impedance at contact points between end effector and object, a desired rigidity can no longer be generated across the kinematic chain during physical interaction.

The object of the invention is to avoid the above-mentioned disadvantages and thus to improve the execution of a task by a robotic manipulator.

The invention results from the features of the independent claims. Advantageous further developments and embodiments are the subject matter of the dependent claims.

A first aspect of the invention relates to a method of controlling a robotic manipulator having an end effector, the method including:

- providing information regarding a task to be carried out by the robotic manipulator,
- determining a task null space from the provided information via a computing unit, wherein the task null space is characterized by a set of variations of at least one kinematic variable of the end effector with all of which variations the task can be executed,
- establishing observation points by discretizing the task null space into a finite number of the variations via the computing unit,
- executing an optimization method for maximizing or minimizing a predetermined target function, wherein the optimization method includes the execution of a kinematic or dynamic model of the robotic manipulator for each of the observation points with the finite number of variations of the task null space as variables, and
- controlling the robotic manipulator to assume the optimal variation of the end effector determined according to the result of the optimization method.

The robotic manipulator preferably has a kinematic chain of links connected to one another by joints. At the end of the kinematic chain, i.e., at a distal end of the robotic manipulator, an end effector is arranged, via which tasks can be carried out. The task may involve physical interaction with an object in the robotic manipulator's environment, but it may also involve a contactless task such as laser cutting.

By specifying a task for the robotic manipulator, information is provided that can be used to derive which movements and functions the end effector must perform in order to complete the task. For the movements of the end effector, movements of the kinematic chain, in particular, joint angle changes, can also be used.

A computing unit uses this information to automatically determine a task null space. In the publication "Shared Control Templates for Assistive Robotics" by Gabriel Quere, Annette Hagengruber, Maged Iskandar, Samuel Bustamante, Daniel Leidner, Freek Stulp and Jörn Vogel of the Institut für Robotik and Mechatronik des Deutschen Zentrums für Luft- und Raumfahrt (DLR), 2020 IEEE International Conference on Robotics and Automation (ICRA), analyses of tasks that can help to determine the task null space are discussed in more detail. This task null space is not a property of the robotic manipulator, but essentially results from the properties of the task itself. The properties of the robotic manipulator can only play a role insofar as limitations can arise due to the design of the robotic manipulator.

The task null space is defined such that the task can be executed by a set of variations of at least one kinematic variable of the end effector. This set forms the task null space. Preferably, the kinematic variable is a position and/or an orientation of the end effector, particularly preferably a pose of the end effector.

In the example of the position of the end effector, this means that the task null space has a plurality of positions of the end effector with which the task can be completed. This is the case, for example, when the robotic manipulator is to grasp an object with its end effector and the attack point on the object offers several options for grasping the object. In other words, this means that there is a degree of freedom to perform the task that is not directly attributable to the properties of the robotic manipulator, but primarily to the properties of the task, for example, grasping an object at one of a plurality of possible positions within a certain range of the object. In this example, the computing unit automatically determines the region where the object can be grasped so that the task of grasping and transporting the object can be successfully performed. Thus, the task null space represents a degree of freedom in the execution of the tasks.

Only the robot null space mentioned below represents a direct property of the robotic manipulator. As explained in the introduction, the robot null space is a consequence of a redundant kinematic configuration of a robotic manipulator, i.e., in its kinematic chain between the base and the end effector, there are redundant degrees of freedom the states of which can be changed without changing the position and orientation of the end effector in particular. Such a movement therefore takes place within the robot's null space and is also called movement in the "self-motion manifold".

Since an analytical solution for the best kinematic variable of the end effector within the task null space for maximizing or minimizing a given target function is not possible, an optimization method must be carried out in the sense of an iterative search method. Examples of such a method are methods of nonlinear optimization, or a rasterized determination of the target function and the comparison of the individual values of the target function over the given raster of optimization variables. The optimization variables in the present case include a finite number of variations of the task null space, i.e., a finite number of eligible kinematic variables of the end effector within the task null space are examined for their respective value of the target function, wherein a search algorithm such as the gradient method used in non-linear optimization or other methods from the known "line search" methods such as the golden section method must not necessarily examine all variations for their target function, but converges to a particular optimum.

This investigation of the value of the target function is performed using a digital twin of the real robotic manipulator, wherein the digital twin includes a kinematic or dynamic model of the robotic manipulator. At each of the observation points of the discretized task null space, the execution of the task can be simulated by the digital twin of the real robotic manipulator.

Depending on the result of the optimization method, the robotic manipulator is controlled to assume the optimal variation of the task null space, namely the selected at least one kinematic variable of the end effector. Whether a given target function is minimized or maximized depends on the definition of the target function. While typically a cost function is minimized, the cost function can be given a negative sign and a quality function can be formed therefrom, which must be maximized.

It is an advantageous effect of the invention that the execution of a task by a robotic manipulator is improved by examining a task null space in order to optimize a given target variable. The term optimization is the umbrella term for the terms minimizing and maximizing. In contrast to DE 10 2020 116 900 B3, this can be used, for example, to specify a desired rigidity in the kinematic chain of the robotic manipulator with impedance control, thus improving the interaction between the end effector and the object in the environment of the robotic manipulator.

According to an advantageous embodiment, the robotic manipulator has redundant degrees of freedom in its kinematic chain from a base to the end effector, wherein the method further includes:

- determining a respective robot null space for each of the observation points of the task null space by executing a kinematic or dynamic model of the robotic manipulator for each of the observation points by the computing unit, wherein the robot null space is characterized by a movement in the redundant degrees of freedom without requiring a change in the kinematic variable that varies within the task null space; and wherein the optimization method includes the finite number of variations in the task null space and controllable values in the degrees of freedom of its kinematic chain in the respective robot null space as variables, so that the control of the robotic manipulator to assume the variation determined according to the result of the optimization method and of the determined values in the degrees of freedom of its kinematic chain occurs in the robot null space.

This results in a method for controlling a robotic manipulator with an end effector and with redundant degrees of freedom in its kinematic chain from a base to the end effector, wherein the method includes:

- providing information about a task to be carried out by the robotic manipulator;
- determining a task null space from the information provided by a computing unit, wherein the task null space is characterized by a set of such variations of at least one kinematic variable of the end effector with all of which the task can be carried out;
- setting up observation points by discretizing the task null space into a finite number of variations by the computing unit;
- determining a respective robot null space for each of the observation points of the task null space by executing a kinematic or dynamic model of the robotic manipulator for each of the observation points by the computing unit, wherein the robot null space is characterized by a movement in the redundant degrees of freedom without necessarily changing the kinematic variable that varies within the task null space;

executing an optimization method to maximize or minimize a predetermined target function, wherein the optimization method includes executing a kinematic or dynamic model of the robotic manipulator for each of the observation points with the finite number of variations in the task null space and controllable values in the degrees of freedom of its kinematic chain in the respective robot null space as variables; and controlling the robotic manipulator to assume the optimal variation in the task null space determined according to the result of the optimization method and the determined optimal values in the degrees of freedom of the kinematic chain in the robot null space.

The optimization method thus has multiple variables, which usually form an overdetermined system of equations. The optimization method attempts to select the variables in such a way that the given target variable becomes optimal, i.e., maximum or minimum depending on the definition. In contrast to the sole determination of the values in degrees of freedom in the robot null space of a redundant robotic manipulator, in this embodiment additional variables are added which arise from the discretization of the task null space. This leads to better execution of a given task.

According to a further advantageous embodiment, a combined null space is determined by composing the robot null spaces determined via the observation points, wherein a null space control is carried out in this combined null space, wherein a desired physical interaction with an object of the environment is carried out by adjusting the null space rigidity of the combined null space.

By considering the task null space, an adjustment of the null space rigidity is possible, which is not possible, for example, with the DE 10 2020 116 900 B3 mentioned in the introduction. Thus, a desired physical interaction of the robotic manipulator with an object from the environment can be advantageously controlled, in particular, by mutually acting force.

According to a further advantageous embodiment, the maximization or minimization of a given target function is the maximization of a manipulability measure taking into account physical or predefined limits in the degrees of freedom of the robotic manipulator.

Any definition of the manipulability measure known in the state of the art that is suitable for the respective application can be used as a manipulability measure, for example, the manipulability measure proposed in DE 10 2020 116 900 B3.

According to a further advantageous embodiment, the optimization algorithm determines current and planned future values in the degrees of freedom of its kinematic chain and/or the kinematic variable of the end effector.

As an alternative to the sole target of the manipulability measure, multi-target optimization is used, i.e., the given target function is composed of several individual targets, as with cost functions.

According to a further advantageous embodiment, the optimization algorithm includes a multi-target optimization with the objectives of maximizing a manipulability measure and a further objective with respect to a cost function depending on the planned temporal variation of the values in the degrees of freedom of the kinematic chain of the robotic manipulator and/or of the kinematic variable of the end effector.

According to a further advantageous embodiment, the further objective is to minimize the movement, that is to minimize the length of the traveled movement path, of the end effector in the task null space.

Further targets in multi-target optimization may include one or more of the following: minimizing the energy required for actuators of the robotic manipulator, minimizing the time required to execute the task, minimizing the maximum occurring speed of a reference point of the robotic manipulator when executing the task, minimizing the maximum occurring acceleration of a reference point of the robotic manipulator when executing the task, maximizing the residence time of links of the robotic manipulator in the specified spatial zones.

According to a further advantageous embodiment, a predetermined maximum value of the movement of the end effector in the task null space is used as a restriction in the optimization algorithm.

A further aspect of the invention relates to a system for controlling a robotic manipulator having an end effector, having an interface for providing information regarding a task to be executed by the robotic manipulator and a computing unit designed to determine a task null space from the provided information, wherein the task null space is characterized by a set of such variations of at least one kinematic variable of the end effector, with all of which the task can be executed, and which is executed for setting observation points by discretizing the task null space into a finite number of the variations and for executing an optimization method for maximizing or minimizing a predetermined target function, wherein the optimization method includes the execution of a kinematic or dynamic model of the robotic manipulator for each of the observation points and for controlling the robotic manipulator to assume the optimal variation of the end effector determined according to the result of the optimization method.

Advantages and preferred developments of the proposed system result from an analogous and corresponding transfer of the statements made above in conjunction with the proposed method.

Another aspect of the invention relates to a robotic manipulator with a system as described above and below.

Further advantages, features, and details will be apparent from the following description, in which—possibly with reference to the drawings—at least one example embodiment is described in detail.

Identical, similar, and/or functionally identical parts are provided with the same reference numerals.

The illustrations in the figures are schematic and not to scale.

DETAILED DESCRIPTION

Figure 1:
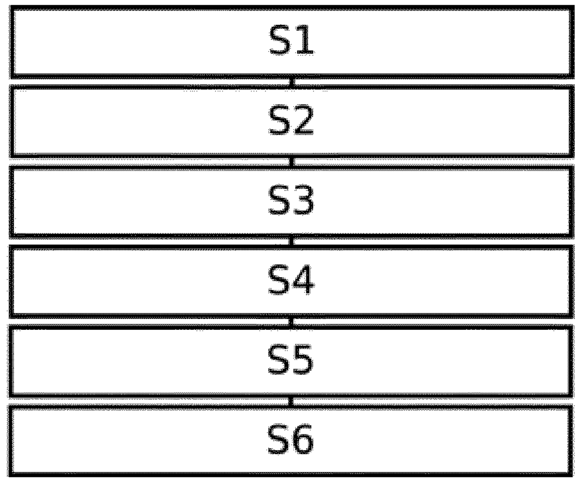
FIG. 1 shows a method for controlling a robotic manipulator in task null space according to an example embodiment of the invention.
Figure 2:
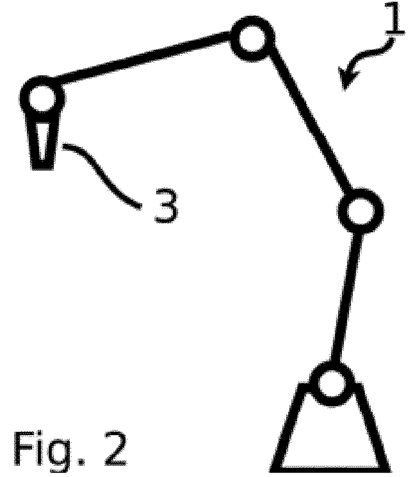
FIG. 2 shows a robotic manipulator for carrying out the method according to FIG. 1.
Figure 3:
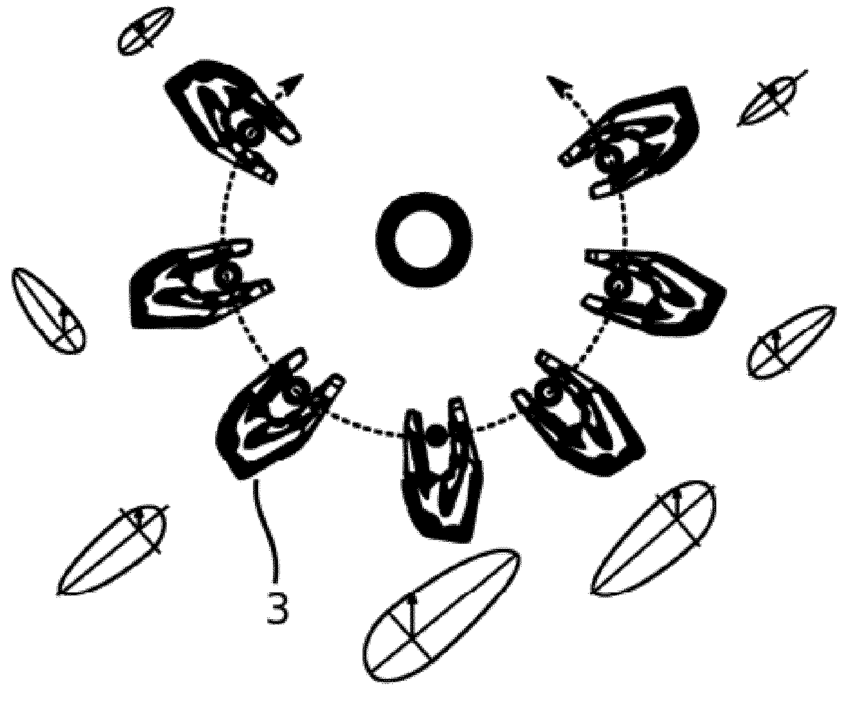
FIG. 3 shows a first example situation in which a task null space is derived according to an example embodiment of the invention.
Figure 4:
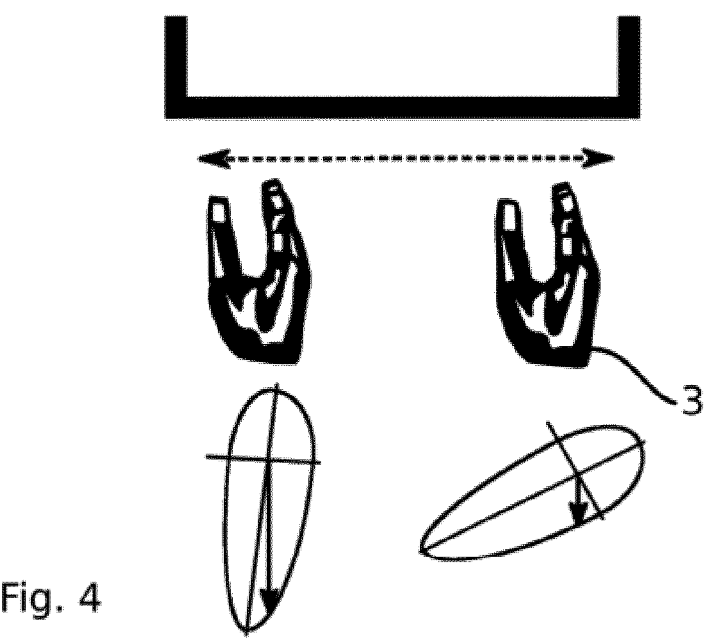
FIG. 4 shows a second example situation in which a task null space is derived according to an example embodiment of the invention.

FIG. 1 shows a method for controlling a robotic manipulator 1 with an end effector 3 and with redundant degrees of freedom in its kinematic chain from a base to the end effector 3. The method is carried out on a robotic manipulator 1 as shown in FIG. 2. For the following description, reference can therefore be made to both FIG. 1 and FIG. 2. In a first step of the method, information is provided S1 about a task to be performed by the robotic manipulator 1. Example tasks are shown in FIG. 3 and FIG. 4. In these tasks, a computing unit receives the position of an object in the environment of the robotic manipulator 1, and an instruction about what to do with this object, in particular, how to move this object. Since the movement of the respective object can take place from several attack positions and orientations of the end effector 3 of the robotic manipulator 1, it is possible for the computing unit in a second step to determine a task null space from the information provided S2, wherein the task null space is characterized by a set of such variations of at least the position and orientation of the end effector 3, with all of which the task can be carried out, i.e., the object can be grasped and moved. In the next step, the establishing S3 of observation points is carried out by discretizing the task null space into a finite number of variations by the computing unit. Furthermore, a respective robot null space is determined S4 for each of the observation points of the task null space for each of the observation points by the computing unit, wherein the robot null space is characterized by a movement in the redundant degrees of freedom without necessarily changing the position and orientation of the end effector 3, which varies within the task null space; furthermore, an optimization method is carried out S5 to maximize a manipulability measure. The optimization method involves the repeated execution of a kinematic model of the robotic manipulator 1 for each of the observation points with the finite number of variations of the task null space and controllable values in the degrees of freedom of its kinematic chain in the respective robot null space, as variables. The best combination of all examined values of the variables is used to control S6 of the robotic manipulator 1. A null space control in the combined null space of robot null space and task null space also allows an adjustment of the null space rigidity and thus a desired, impedance-controlled physical interaction with the respective object.

FIG. 3 shows the end effector 3 of a robotic manipulator 1 in various possible poses for gripping an object. The object can be grasped from different sides. The totality of the poses of the end effector 3 that allow grasping the object forms the task null space. The given target function is a manipulability measure expressed by a manipulability ellipsoid the volume of which represents a measure of manipulability, while the drawn arrow represents the direction information in the manipulability measure. The black circular ring inside the end effector 3 correlates with the manipulability measure. In one variation, the circle is completely filled, indicating maximum manipulability. This pose of end effector 3 is chosen accordingly.

In FIG. 4, a further application is shown analogous to FIG. 3, wherein again the given direction information with arrows is assigned to the manipulability. The end effector 3 is to be used to open a symbolically shown drawer, wherein the task null space is created by the fact that the position of the end effector 3 can be moved along the dashed transverse axis of the drawer, while the drawer can be opened in all these positions.

Figure 5:
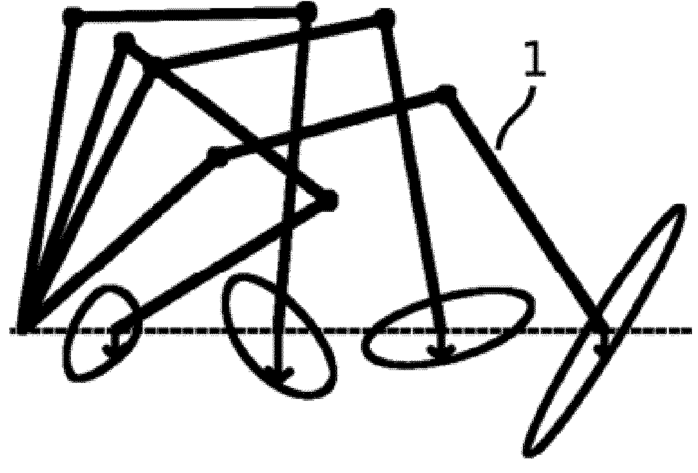
FIG. 5 shows an example robotic manipulator for illustrating a combined null space according to an example embodiment of the invention.

FIG. 5 shows a sketch of a robotic manipulator 1 shown in four different poses that correspond to the task null space, by the end effector 3 taking a correspondingly different position. In this example, the task null space is divided into four variations, which are examined for optimization.

Figure 6:
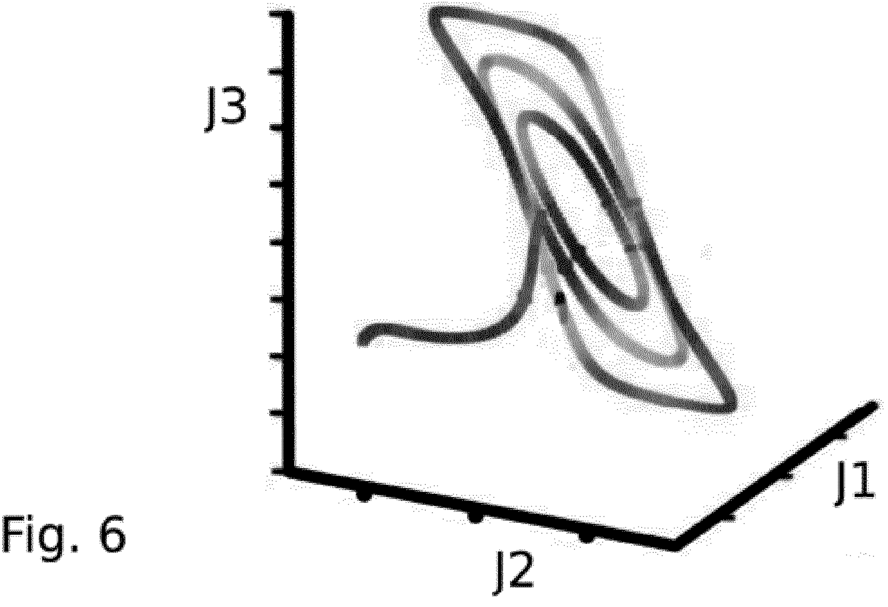
FIG. 6 shows a manipulability diagram for FIG. 5.

FIG. 6 shows a corresponding diagram to FIG. 5, wherein the three joint angles J1, J2, J3 of the robotic manipulator 1 are plotted along the axes of the diagram. A color of the respective curve indicates a corresponding value of the manipulability measure. For each of the four variations of the task null space, a corresponding robot null space is investigated. The four curves in FIG. 6 correspond to the four poses of the robotic manipulator 1 in FIG. 5.

Figure 7:
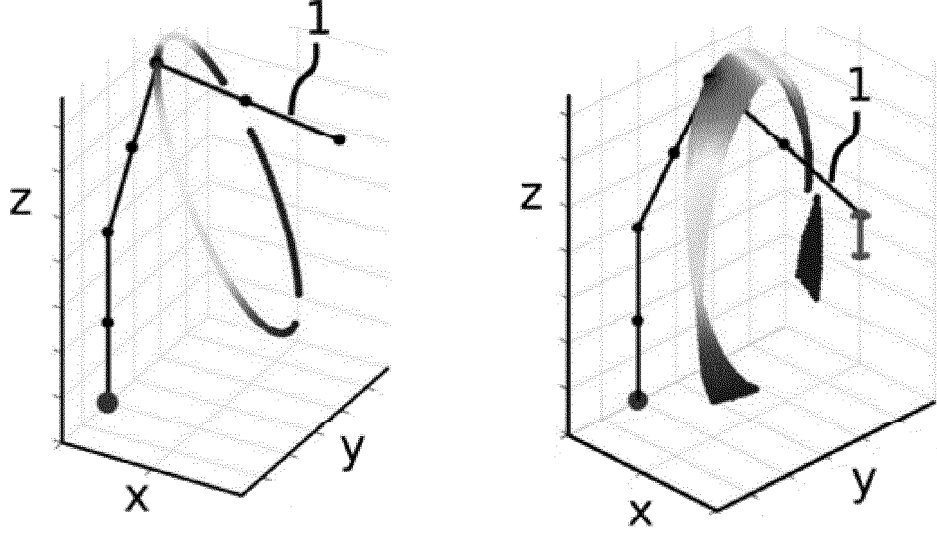
FIG. 7 shows a graphical representation of the null spaces of a robotic manipulator according to an example embodiment of the invention.

FIG. 7 shows in the left part of the image symbolically a redundant robotic manipulator 1, in which the elbow joint can be changed in its position without changing the position of the end effector 3. This is symbolized by the circle shown, over which the elbow position can be changed. The color of the circle indicates a manipulability measure for each of the positions of the elbow joint of robotic manipulator 1. In the right part of the image, the task null space of the robotic manipulator 1 is added, which allows a vertical movement in the area of the end effector 3 without making the execution of the task impossible. The circle shown in the left part of the image therefore becomes a flat band in the right part of the image, wherein again the color gradients across the band correlate with the measure of manipulability.

Although the invention has been further illustrated and described in detail by way of preferred example embodiments, the invention is not limited by the disclosed examples, and other variations can be derived therefrom by a person skilled in the art without departing from the scope of protection of the invention. It is therefore clear that various possible variations exists. It is also clear that exemplified embodiments are really only examples, which are not to be construed in any way as limiting the scope of protection, applicability, or configuration of the invention. Rather, the foregoing description and the description of the figures enable a person skilled in the art to implement the example embodiments, and such person may make various changes knowing the disclosed inventive concept, for example with regard to the function or arrangement of individual elements cited in an example embodiment, without departing from the scope of protection as defined by the claims and their legal equivalents, such as more extensive explanations in the description.

LIST OF REFERENCE NUMERALS

1 robotic manipulator
3 end effector
S1 provide
S2 determine
S3 establish
S4 determine
S5 execute
S6 control

The invention claimed is:

1. A method of controlling a robotic manipulator having an end effector, wherein the robotic manipulator has redundant degrees of freedom in its kinematic chain from a base to the end effector, the method comprising:

providing information about a task to be performed by the robotic manipulator;

determining via a computing unit a task null space from the information provided, wherein the task null space is characterized by a set of variations of at least one kinematic variable of the end effector with all of which the task is capable of being carried out;

establishing via the computing unit observation points by discretizing the task null space into a finite plurality of variations;

determining a respective robot null space for each of the observation points of the task null space by executing via the computing unit the kinematic or dynamic model of the robotic manipulator for each of the observation points, wherein the robot null space is characterized by a movement in the redundant degrees of freedom without necessarily changing the kinematic variable that varied within the task null space;

executing an optimization method to maximize or minimize a predetermined target function, wherein the optimization method comprises executing a kinematic or dynamic model of the robotic manipulator for each of the observation points, and controlling the robotic manipulator to assume an optimal variation from the task null space determined according to a result of the optimization method, wherein the optimization method comprises the finite plurality of variations in the task null space and controllable values in the degrees of freedom of the kinematic chain in the respective robot null space as variables, so that the control of the robotic manipulator assumes the optimal variation determined according to the result of the optimization method from the task null space and the determined optimal values in the degrees of freedom of the kinematic chain occurs in the robot null space.

2. The method according to claim 1, wherein the method further comprises:

determining a combined null space by combining the robot null spaces determined via the observation points;

carrying out a null space control in the combined null space; and carrying out a desired physical interaction with an object of an environment by adjusting a null space rigidity of the combined null space.

3. The method according to claim 1, wherein maximization or minimization of the predetermined target function is the maximization of a manipulability measure taking into account physical or predefined limits in the degrees of freedom of the robotic manipulator.

4. The method according to claim 3, wherein the optimization method comprises a multi-target optimization with an objective of maximizing the manipulability measure.

5. The method according to claim 1, wherein the optimization method determines current and planned future values in the degrees of freedom of the kinematic chain and/or the kinematic variable of the end effector.

6. The method according to claim 5, wherein the optimization method comprises a multi-target optimization with a further objective with respect to a cost function depending on a planned temporal variation of the values in the degrees of freedom of the kinematic chain of the robotic manipulator and/or of the kinematic variable of the end effector.

7. The method according to claim 1, wherein the further objective is to minimize movement of the end effector in the task null space.

8. The method according to claim 1, wherein a predetermined maximum value of movement of the end effector in the task null space is used as a restriction in the optimization algorithm.

9. A system to control a robotic manipulator having an end effector wherein the robotic manipulator has redundant degrees of freedom in its kinematic chain from a base to the end effector, the system comprising:

an interface to provide information regarding a task to be executed by the robotic manipulator; and a computing unit configured to;

determine a task null space from the provided information, wherein the task null space is characterized by a set of variations of at least one kinematic variable of the end effector, with all of which the task is capable of being executed;

establish observation points by discretizing the task null space into a finite number of variations;

determine a respective robot null space for each of the observation points of the task null space by executing the kinematic or dynamic model of the robotic manipulator for each of the observation points, wherein the robot null space is characterized by a movement in the redundant degrees of freedom without necessarily changing the kinematic variable that varied within the task null space;

execute an optimization method to maximize or minimize a predetermined target function, wherein the optimization method comprises execution of a kinematic or dynamic model of the robotic manipulator for each of the observation points; and control the robotic manipulator to assume an optimal variation of the end effector determined according to a result of the optimization method, wherein the optimization method comprises the finite plurality of variations in the task null space and controllable values in the degrees of freedom of the kinematic chain in the respective robot null space as variables, so that the control of the robotic manipulator assumes the optimal variation determined according to the result of the optimization method from the task null space and the determined optimal values in the degrees of freedom of the kinematic chain occurs in the robot null space.

10. The system according to claim 9, wherein the computing unit is further configured to:

determine a combined null space by combining the robot null spaces determined via the observation points;

carry out a null space control in the combined null space; and carry out a desired physical interaction with an object of an environment by adjusting a null space rigidity of the combined null space.

11. The system according to claim 9, wherein maximization or minimization of the predetermined target function is the maximization of a manipulability measure taking into account physical or predefined limits in the degrees of freedom of the robotic manipulator.

12. The system according to claim 11, wherein the optimization method comprises a multi-target optimization with an objective of maximizing the manipulability measure.

13. The system according to claim 9, wherein the optimization method determines current and planned future values in the degrees of freedom of the kinematic chain and/or the kinematic variable of the end effector.

14. The method according to claim 13, wherein the optimization method comprises a multi-target optimization with a further objective with respect to a cost function depending on a planned temporal variation of the values in the degrees of freedom of the kinematic chain of the robotic manipulator and/or of the kinematic variable of the end effector.

15. The system according to claim 14, wherein the further objective is to minimize movement of the end effector in the task null space.

16. The system according to claim 9, wherein a predetermined maximum value of movement of the end effector in the task null space is used as a restriction in the optimization algorithm.

17. A robotic manipulator with a system according to claim 9.

* * * * *